(12) United States Patent
Chen et al.

(10) Patent No.: US 10,764,572 B2
(45) Date of Patent: Sep. 1, 2020

(54) MONITOR USAGE INFORMATION

(71) Applicant: HEWLETT-PACKARD DEVELOPMENT COMPANY, L.P., Spring, TX (US)

(72) Inventors: Wen Shih Chen, Taipei (TW); Alois Bonnet, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/342,141

(22) PCT Filed: Oct. 13, 2016

(86) PCT No.: PCT/US2016/056883
§ 371 (c)(1),
(2) Date: Apr. 15, 2019

(87) PCT Pub. No.: WO2018/071031
PCT Pub. Date: Apr. 19, 2018

(65) Prior Publication Data
US 2019/0260986 A1    Aug. 22, 2019

(51) Int. Cl.
*H04N 17/04* (2006.01)
*G06F 21/62* (2013.01)
(Continued)

(52) U.S. Cl.
CPC ............ *H04N 17/04* (2013.01); *G06F 17/40* (2013.01); *G06F 21/6254* (2013.01); *G09G 5/006* (2013.01); *H04L 12/2807* (2013.01); *H04N 5/445* (2013.01); *H04N 17/004* (2013.01); *H04N 21/25866* (2013.01);
(Continued)

(58) Field of Classification Search
CPC .. H04N 5/445; H04N 5/44543; H04N 13/183; H04N 21/258–25891; H04N 21/44213–44222; H04N 17/00–06; H04N 2005/44517; H04N 2005/44578; H04N 2005/44569; H04N 2005/44586; G06F 21/6254; H04L 12/2803–2807;
(Continued)

(56) References Cited

U.S. PATENT DOCUMENTS 5,819,156 A    10/1998  Belmont
7,536,268 B2 *  5/2009  Owhadi .............. G09G 3/006
                                                 235/454
(Continued)

FOREIGN PATENT DOCUMENTS

JP    2008092342 A    4/2008
JP    2013125353 A    6/2013

OTHER PUBLICATIONS

Samsung's Smart TVs Are Collecting and Storing Your Private Conversations, Feb. 8, 2015, <https://www.techdirt.com/articles/20150206/04532329928/samsungs-smart-tvs-are-collecting-storing-your-private-conversations.shtml>.

*Primary Examiner* — Brendan Y Higa
(74) *Attorney, Agent, or Firm* — HP Inc. Patent Department (57) ABSTRACT

A monitor includes a display device to display images; an integrated circuit to control the display device; and a video port to connect the monitor to a host device. The integrated circuit is programmed to collect usage information and output the usage information through the video port to the host device.

15 Claims, 9 Drawing Sheets

(51) Int. Cl.
  *H04N 5/445* (2011.01)
  *G06F 17/40* (2006.01)
  *H04L 12/28* (2006.01)
  *H04N 21/258* (2011.01)
  *H04N 17/00* (2006.01)
  *G09G 5/00* (2006.01)
  *H04N 21/442* (2011.01)

(52) U.S. Cl.
  CPC ... *H04N 21/44213* (2013.01); *G09G 2370/12* (2013.01); *H04N 2005/44517* (2013.01); *H04N 2005/44569* (2013.01)

(58) Field of Classification Search
  CPC ...... H04L 12/2823–2829; G09G 5/003; G09G 5/006; G09G 2370/12
  See application file for complete search history.

(56) References Cited

U.S. PATENT DOCUMENTS

| | | | |
|---|---|---|---|
| 8,730,395 B2 | 5/2014 | Kojima et al. | |
| 8,896,704 B2 * | 11/2014 | Huang | H04N 17/04 348/177 |
| 9,053,657 B2 * | 6/2015 | Wang | G09G 5/006 |
| 9,232,270 B2 * | 1/2016 | Kwon | G09G 5/006 |
| 2002/0021665 A1 * | 2/2002 | Bhagavath | H04L 43/00 370/229 |
| 2003/0177440 A1 * | 9/2003 | Kegoya | G05B 19/05 715/273 |
| 2004/0181818 A1 * | 9/2004 | Heyner | H04N 21/4755 725/146 |
| 2005/0240959 A1 | 10/2005 | Kuhn et al. | |
| 2007/0046820 A1 * | 3/2007 | Mead | H04N 5/145 348/571 |
| 2008/0141109 A1 * | 6/2008 | Chen | G09G 5/003 715/203 |
| 2009/0055852 A1 | 2/2009 | Sardera | |
| 2009/0150545 A1 | 6/2009 | Flores et al. | |
| 2009/0195694 A1 * | 8/2009 | Murashima | H04N 5/4403 348/563 |
| 2009/0315998 A1 * | 12/2009 | Garg | H04N 17/04 348/177 |
| 2010/0064312 A1 * | 3/2010 | Francis | H04N 21/4852 725/37 |
| 2015/0058681 A1 | 3/2015 | Lingannapeta et al. | |
| 2018/0005603 A1 * | 1/2018 | Saroor | G09G 5/006 |
| 2018/0139238 A1 * | 5/2018 | Schultz | G06F 21/53 |
| 2018/0278926 A1 * | 9/2018 | Mendenhall | G06F 3/0482 |
| 2018/0285048 A1 * | 10/2018 | Abraham | G06F 3/1423 |

* cited by examiner

MONITOR USAGE INFORMATION

BACKGROUND

Many host or electronic devices include a user interface with a display device. This display device may be incorporated into the device, such as with a laptop or smartphone. Alternatively, the display device may be an external device that connects to the host device. Such an external display device may be the only display device of the host device or may supplement a display already incorporated into the host device. The more display surface is available, the more convenient the user interface may be to use.

BRIEF DESCRIPTION OF THE DRAWINGS

The accompanying drawings illustrate various implementations of the principles described herein and are a part of the specification. The illustrated implementations are merely examples and do not limit the scope of the claims.

Throughout the drawings, identical reference numbers designate similar, but not necessarily identical, elements.

DETAILED DESCRIPTION

As noted above, many host or electronic devices include a user interface with a display device. This display device may be incorporated into the device, such as with a laptop or smartphone, or may be an external device or monitor that connects to the host device.

Such display devices or monitors can include a wide variety of settings and features that a user may adjust or use as needed. For example, a user may adjust the brightness or volume settings of a monitor, or may periodically use a Picture-in-Picture (PIP) or Picture-by-Picture (PbP) feature of a monitor. Also, the user may use any of a variety of different ports to connect the monitor to a host device and may use the monitor with other peripheral devices.

For designers and manufacturers of such monitors, the information as to how users actually use their monitors may inform future design and manufacturing decisions. For example, designers and manufacturers may want to know what settings a user adjusts, how frequently and to what value; or what features are used and how frequently. To the contrary, it may be significant to know which settings and features are not used or largely neglected. Designers and manufacturers may also want to know which ports of a monitor are actually used to connect with a host device or with a number of other peripheral devices.

Consequently, the present specification describes, for example, a monitor that includes a display device to display images; an integrated circuit to control the display device; and a video port to connect the monitor to a host device. The integrated circuit is programmed to collect usage information and output the usage information through the video port to the host device.

In another example, the present specification describes a host device that includes a processor; a memory to provide programming for the processor; a video port to connect the host device to an external monitor; and a driver to be operated by the processor to control the external monitor through the video port to control the external monitor through the video port. The driver is to receive usage information from the external monitor through the video port, the usage information characterizing operation of the external monitor, and transmit the usage information to another device.

In another example, the present specification describes a method including, with a monitor, collecting usage information recording usage of the monitor; and transmitting the usage information to a host device through a video port of the monitor to which the host device is connected.

As used herein and in the following claims, the term "monitor" refers to an external display device that is connected to or in communication with a host device to provide display space for output video and, in some cases, audio, of the host device.

As used herein and in the following claims, the term "display device" refers to the component of a monitor on which video output from the host device is displayed. The display device may also be used to display an On-Screen Display (OSD) of the monitor with or without input from a host device.

As used herein and in the following claims, the term "host device" refers to an electronic device that provides video and, in some cases, audio output to a monitor. Examples of host devices including, laptop computers, desktop computers, tablet computers, smartphones, server computers and others.

As used herein and in the following claims, the term "video port" refers to a port at which a monitor is connected to a host device for receiving video output from the host device. The video port may also carry audio output from the host device.

Figure 1:
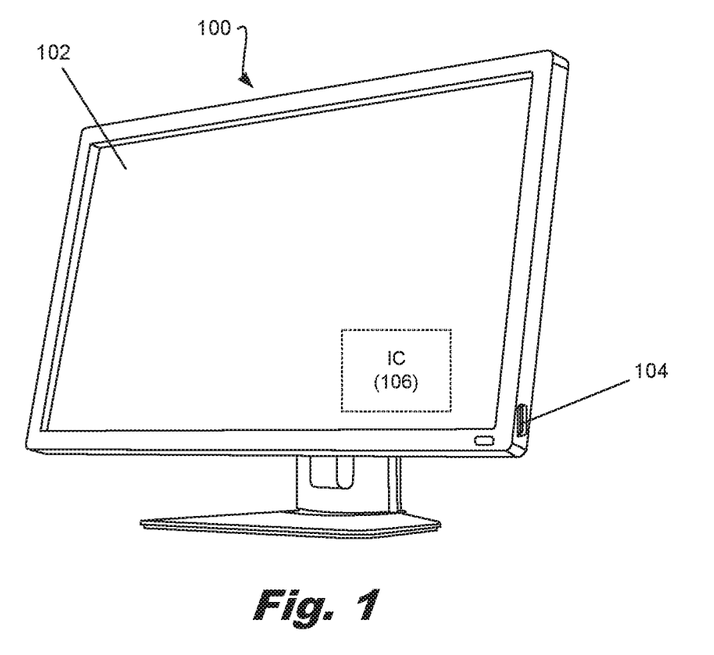
FIG. 1 is an illustration of an example monitor consistent with the disclosed implementations.

FIG. 1 is an illustration of an example monitor consistent with the disclosed implementations. As shown in FIG. 1, the example monitor (100) includes a display device (102) to display images; an integrated circuit (106) to control the display device (102); and a video port (104) to connect the monitor to a host device. The integrated circuit (106) is programmed to collect usage information and output the usage information through the video port (104) to the host device.

The display device (102) may be, for example, a liquid crystal display (LCD) device or other type of display device. Other types of display devices include, but are not limited to, Cathode Ray Tube (CRT) displays, Electroluminescent displays (ELD), Electronic paper, Plasma display panel (PDP) and Organic light-emitting diode display (OLED).

The integrated circuit (106) may include, in various examples, a processor, an Application Specific Integrated Circuit (ASIC) and memory. The memory may be, for example, Flash memory, an Embedded MultiMediaCard (EMMC), Electrically Erasable Programmable Read-Only Memory (EEPROM) or other type of memory.

The video port (104) may be, for example, High-Definition Multimedia Interface (HDMI) or other type of video port such as Video Graphics Array (VGA), S-Video, DisplayPort (DP) and Digital Visual Interface (DVI). The HDMI standard supports two-way communication both to and from a host device communicating with the monitor (100). Consequently, as noted above, the integrated circuit (106) is programmed to collect usage information and output the usage information through the video port (104) to the host device.

Figure 2:
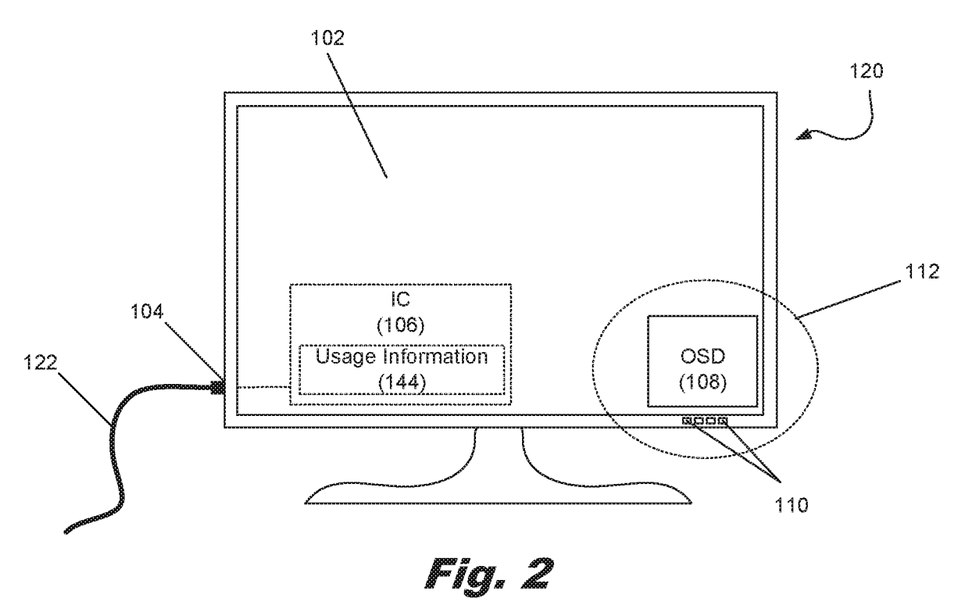
FIG. 2 is another illustration of an example monitor consistent with the disclosed implementations.

FIG. 2 is another illustration of an example monitor consistent with the disclosed implementations. As shown in FIG. 2, the monitor (120) again includes a display device (102), integrated circuit (106) and video port (104). The video cable (122) is connected to the video port (104) and allows communication between the monitor (120) and a host device.

As mentioned above, the monitor (120) will have a number of settings that can be adjusted by the user. Such settings may include, for example, monitor brightness, contrast, volume, resolution, and others. Some settings may affect images displayed by the monitor (120), and some settings may affect behavior of the monitor (120) unrelated to images displayed by the monitor.

Additionally, the monitor (120) may have a number of features that user may periodically invoke. Such features include, for example, backlighting, Picture-in-Picture (PIP), Picture-by-Picture (PbP), a 3-Dimensional display mode, an internal web camera, and others.

To allow a user to adjust monitor settings or invoke different monitor features, the monitor (102) includes a user interface (112). In the illustrated example, the user interface (112) includes an On-Screen Display (OSD) (108) and a number of physical keys (110) in the bezel of the monitor adjacent the OSD. However, this is only one example of a user interface for a monitor.

The OSD (108) can be generated by the integrated circuit (106) and is displayed in place of, or superimposed over, any output being displayed from a host device. Alternatively, the OSD (108) may be generated even if no host device is connected to the monitor (120). The OSD (108) may display current settings, controls for adjusting settings, and controls for the various features available. The OSD (108) may include a menu of the different settings/features a user may wish to access.

The user can navigate around the OSD and make selections or adjust parameters using the keys (110) on the bezel of the monitor (120). The keys (110) may also be used to elicit and turn off display of the OSD as needed. For example, a user might push one of the keys (110) to elicit display of the OSD (108), use the keys to navigate a menu of settings to highlight the setting desired, use one of the keys to select that setting, use the keys to increase or decrease a parameter for that setting and use the keys to turn off display of the OSD.

As shown in FIG. 2, the integrated circuit (106) may keep a record of the user input to the monitor (120) that defines usage information (144) for the monitor. For example, the usage information (144) may include a listing of which settings are adjusted, how frequently those settings are adjusted and what values the settings are adjusted to. The usage information (144) may also include a listing of which features a user uses and how frequently and for how long each features is used. The usage information (144) will include other information, as described below, such as which video port is used to connect the monitor to a host device and which other ports of the monitor are used, for example, to connect other peripheral devices to the monitor. All of this information will be valuable to designers and manufacturers of monitors.

As noted above, the video cable (122), such as an HDMI cable, will deliver video and audio data to the monitor (120) from a host device, but will also support two-way communication such that the usage information (144) can be communicated by the integrated circuit (106) through the video port (104) and cable (122) to the host device. Some Universal Serial Bus (USB) protocols also support two-way communication including video and data. This two-way communication will be described in more detail below.

Figure 3:
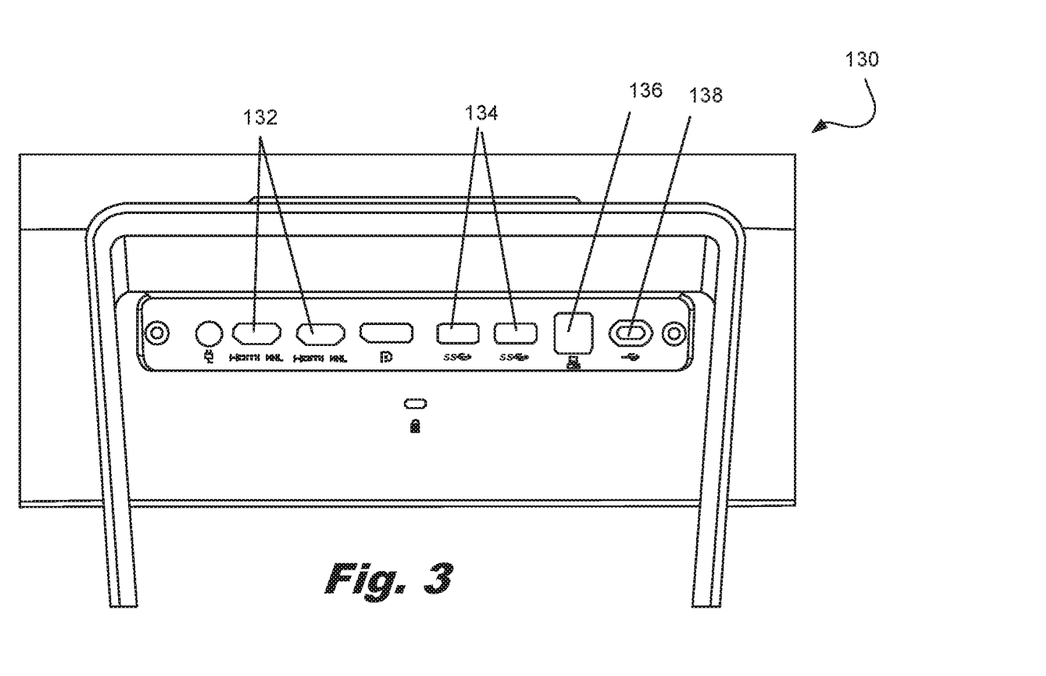
FIG. 3 is an illustration of a range of ports for an example monitor consistent with the disclosed implementations.

FIG. 3 is an illustration of a range of ports for an example monitor consistent with the disclosed implementations. As shown in FIG. 3, the various ports may be located on the back of the monitor (130) opposite the display surface. These ports may include one or more High-Definition Multimedia Interface (HDMI) ports (132) with which the monitor receives an audiovisual input signal from a host.

Two or more type-A USB ports (134) may be provided for connecting the monitor to a peripheral such as a keyboard and mouse. A USB 3.0 upstream port (136) and a USB-C upstream port (138) are also included and may be used to connect the monitor to a host or other device.

As noted above, the integrated circuit (106, FIG. 2) may include in the usage information (144, FIG. 2) an indication of which ports are used. For example, the usage information (144, FIG. 2) may indicate which video port among the HDMI ports (132) and other video ports is actually used to connect with a host device. The usage information (144, FIG. 2) may indicate which of the other ports shown in FIG. 3 is used, for example, to connect to other peripheral devices. By implication, knowing which ports are used also indicates which ports are neglected and unused. In this regard, the usage information may also include an indication of the type of monitor where the usage information is collected.

Figure 4:
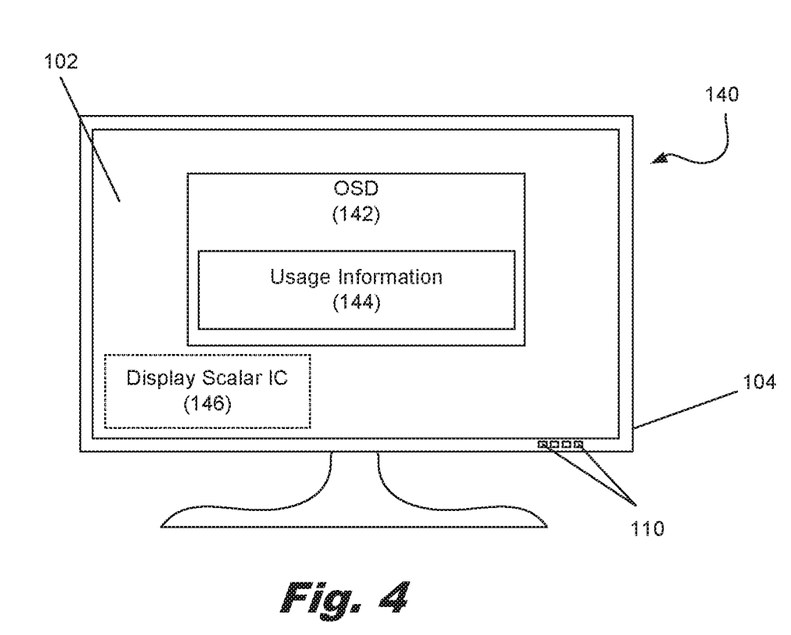
FIG. 4 is another illustration of an example monitor consistent with the disclosed implementations.

FIG. 4 is another illustration of an example monitor (140) consistent with the disclosed implementations. As shown in FIG. 4, the integrated circuit may be, specifically, a display scaler integrated circuit (146). A scaler IC can include an On-Screen Display (OSD) engine and the video connection for ports such as HDMI, VGA, DP, DVI, etc. The scaler IC can also include a handshake protocol with a host device using one of these connections so as to be able to transmit usage to the host device.

Additionally, in any of the examples described, the OSD (142) may display the usage information (144). In this way, a user or technician can see the usage information (144) at the monitor, if needed.

Figure 5:
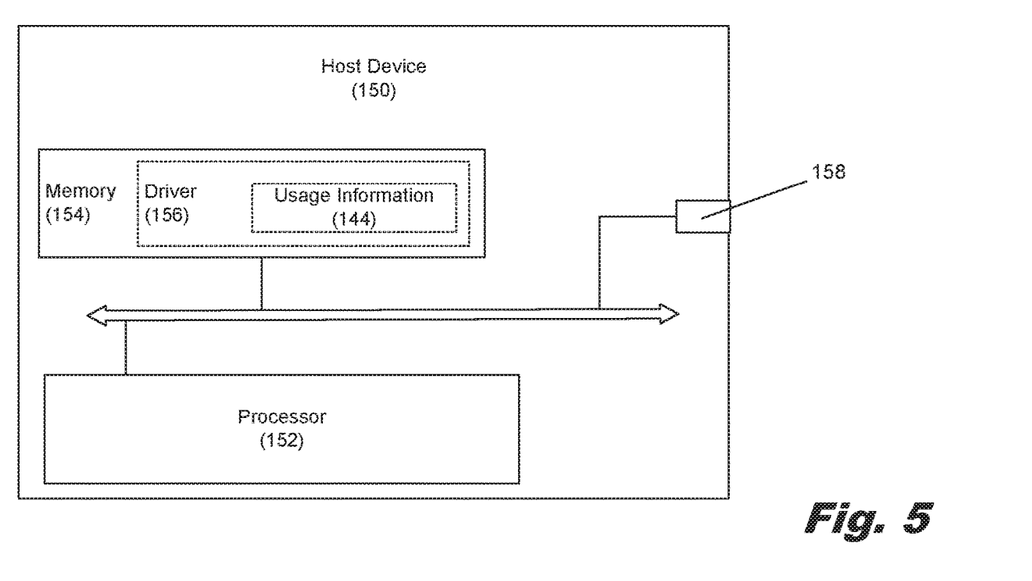
FIG. 5 is a diagram of an example host device consistent with the disclosed implementations.

FIG. 5 is a diagram of an example host device consistent with the disclosed implementations. As shown in FIG. 5, the host device (150) includes a processor (152); a memory (154) to provide programming for the processor (152); a video port (158) to connect the host device to an external monitor; and a driver (156) to be operated by the processor to control the external monitor through the video port to control the external monitor through the video port. The driver (156) is to receive the usage information (144) from the external monitor through the video port (158). As described above, the usage information (144) characterizes operation of the external monitor. The host device (150) may then transmit the usage information (144) to another device.

Before a monitor with the capabilities described herein transmits usage information to a connected host device, the monitor may query or handshake with the video driver of the host device to ensure that the driver has the capability to receive and make use of the monitor usage information. This may include crosschecking a version of the video driver and monitor firmware to ensure the compatibility of the communication.

In some examples, the host device may request the monitor usage information from the monitor. Alternatively, the monitor may transmit the usage information to the host device unrequested. In either case, the transmissions may be periodic, aperiodic, or triggered by an event, such as when the usage information reaches a particular size.

The driver in the host device may also combine the usage information with other information accessible to the driver, such as information about a graphics card or Graphics Processing Unit (GPU), resolutions supported, number of monitors supported, number of monitors connected, ports supported by the host device, sleep settings, etc. The driver may also compress or encrypt the data, encrypt the channel, etc.

The driver may transmit the usage information on for further analysis, as described herein, on a number of different bases, such as periodically, aperiodically, when a triggering event occurs, such as the usage information reaches a particular size, a network connection being established, etc. The driver may transmit the monitor usage information on for further analysis immediately upon receipt, or may store and aggregate usage information from the monitor before transmitting the usage information on to another device.

Figure 6:
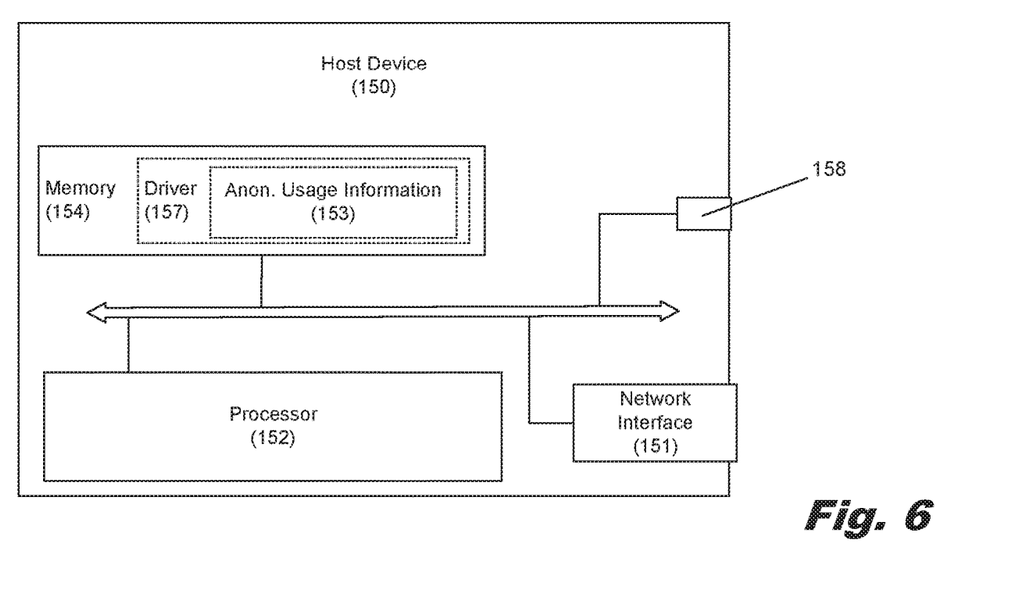
FIG. 6 is another diagram of an example host device consistent with the disclosed implementations.

FIG. 6 is another diagram of an example host device consistent with the disclosed implementations. As shown in FIG. 6, host device (150) includes a network interface (151) with which the host device (150) can transmit the usage information. For example, the driver (157) may direct transmission of the usage information over the network interface (151) and a connected network to a server operated by a designer or manufacturer of a connected monitor. In this way, the designer or manufacturer can get accurate information as to exactly how its monitors are used in the field by users, e.g., which features are popular, which settings are adjusted, what default settings should be considered, etc.

To protect privacy, the driver (157) may render the usage information (153) anonymous before that usage information is transmitted from the host device (150). This means removing from the usage information any data that might identify, or be used to identity, a specific user or specific use case of the monitor. This might include a network address or other such data associated with a specific monitor or user. In some examples, rendering the usage information (153) anonymous includes determining that the usage information (153) does not include any identifying information and leaving the usage information (153) intact.

The driver may be stored on the memory (154) and instantiated by the processor (152).

Figure 7:
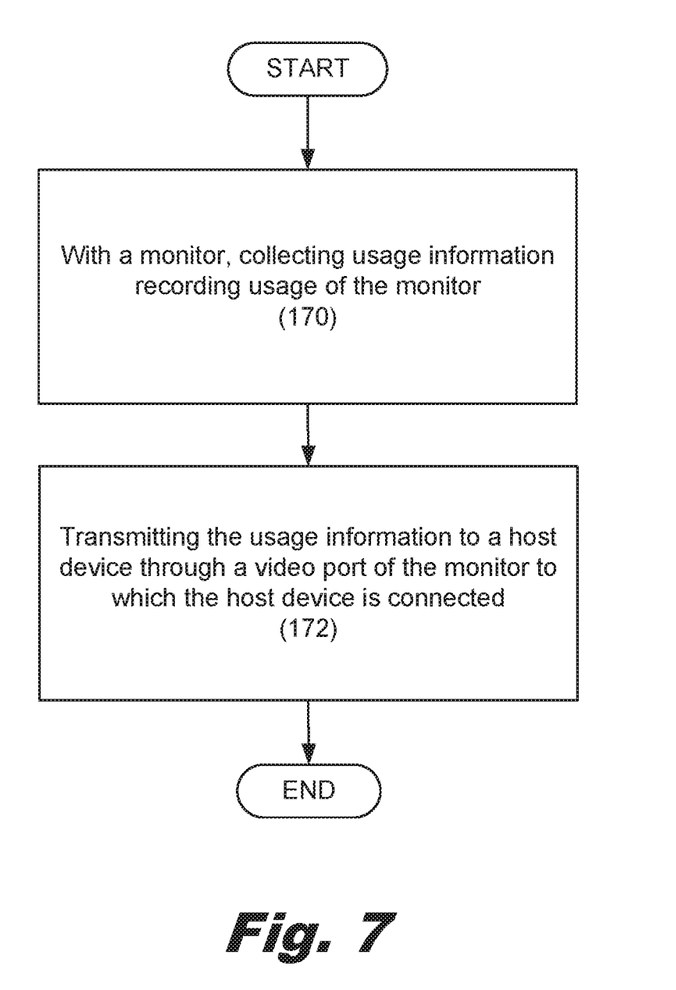
FIG. 7 is a flowchart of an example method of operating a monitor consistent with the disclosed implementations.

FIG. 7 is a flowchart of an example method of operating a monitor consistent with the disclosed implementations. As shown in FIG. 7, the example method includes, with a monitor, collecting (170) usage information recording usage of the monitor; and transmitting (172) the usage information to a host device through a video port of the monitor to which the host device is connected.

Figure 8:
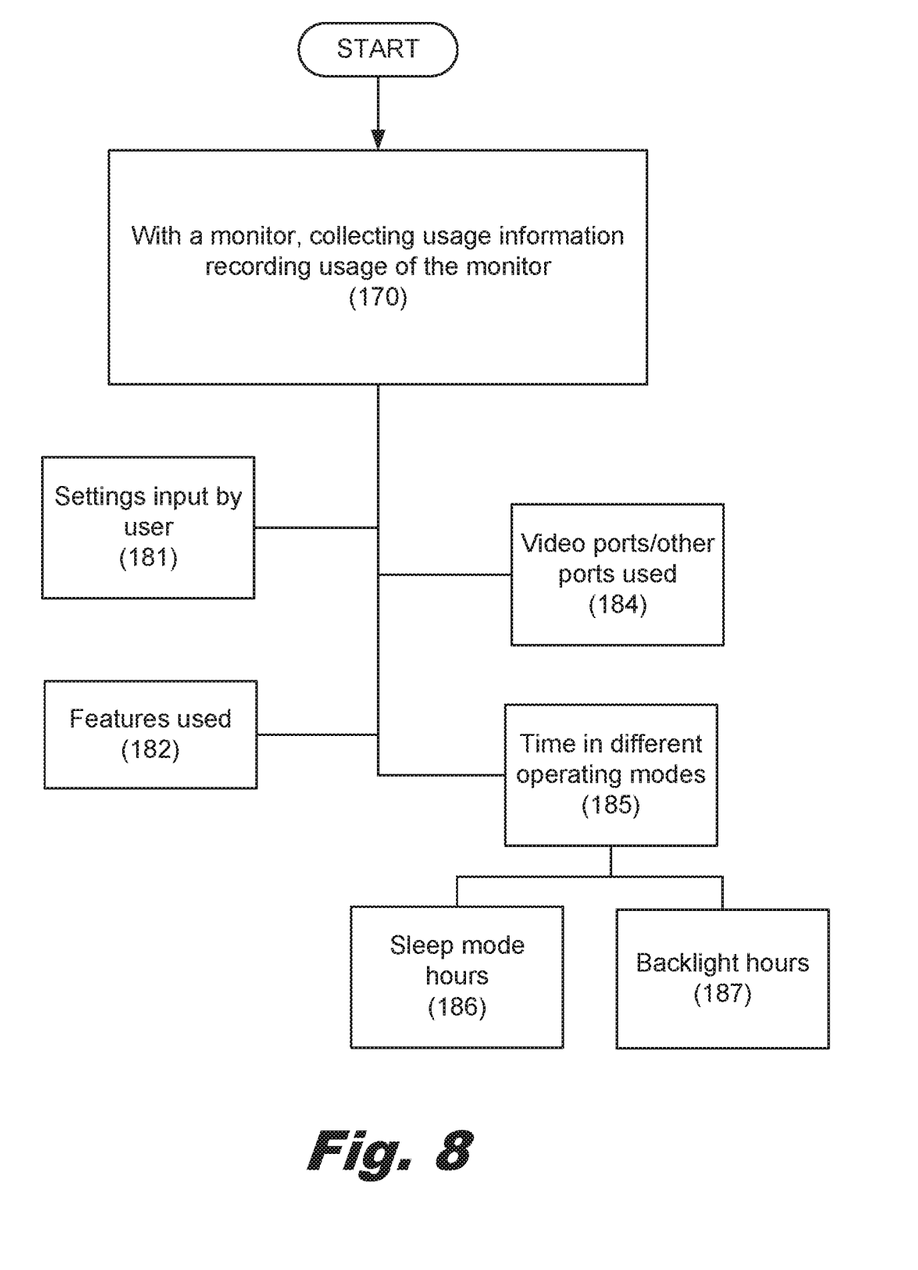
FIG. 8 is a flowchart of another example method of operating a monitor consistent with the disclosed implementations.

FIG. 8 is a flowchart of another example method of operating a monitor consistent with the disclosed implementations. As shown in FIG. 8, the method includes, with a monitor, collecting (170) usage information recording usage of the monitor. The various possible types of usage information have been described above, but are also illustrated in FIG. 8 as follows.

The usage information may include settings input by the user (181). This includes which settings are adjusted and which are ignored, how frequently a setting is adjusted and the value or values to which the setting is adjusted. This may indicate what a default value for a setting should be to minimize the need for user adjustment. This may also indicate which settings to make most readily available, as in the top level of a menu as opposed to settings used less frequently that might be deeper in the menu.

The usage information may also include a listing of the features of the monitor used (182). This includes which features are used, how frequently and for how long. This may indicate which features to emphasize in marketing, how to organize features in a hierarchical menu, and which features to consider omitting in future designs.

The usage information may also include which video port is used (184) to connect the monitor to a host device. The monitor may have a number of different video ports of different types or a number of ports of a single type. As noted above, the monitor may also have other ports for connecting peripherals. Thus, the usage information may include a listing of all such ports used (184).

Lastly, the usage information may include the time spent in different operating modes (185). For example, the usage information might include a count of the hours the monitor is backlit (187) or in sleep mode (186).

Figure 9:
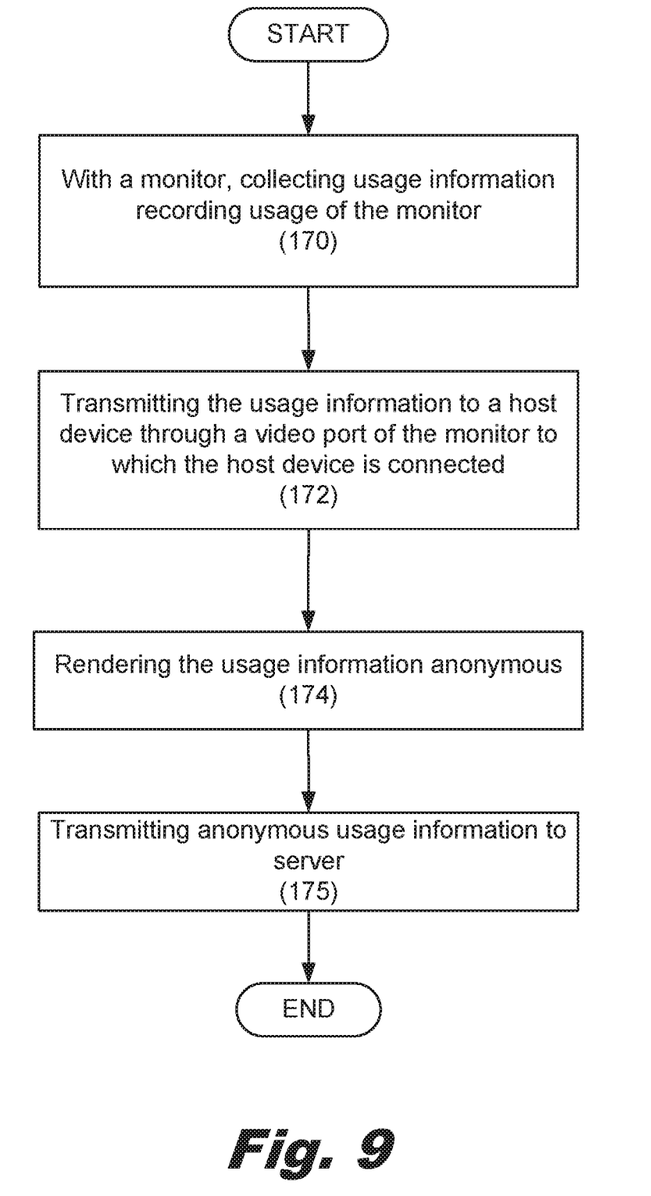
FIG. 9 is a flowchart of another example method of operating a monitor consistent with the disclosed implementations.

FIG. 9 is a flowchart of another example method of operating a monitor consistent with the disclosed implementations. As shown in FIG. 9, the method includes, with a monitor, collecting (170) usage information recording usage of the monitor; and transmitting (172) the usage information to a host device through a video port of the monitor to which the host device is connected.

The method further includes rendering the usage information anonymous (174). As described above, this protects the privacy of the monitor user.

Lastly, the method includes transmitting the anonymous usage information to, for example, a server (175). This server may be operated by a designed or manufacturer of the monitor to aid in supporting monitors of that type and in future monitor designs.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A monitor comprising:
    a display device to display images;
    an integrated circuit to control the display device; and
    a video port to connect the monitor to a host device;
    wherein the integrated circuit is programmed to collect usage information and output the usage information through the video port to the host device.

2. The monitor of claim 1, further comprising a user interface to receive user input controlling settings of the monitor, the usage information comprising what settings are selected by the user input.

3. The monitor of claim 1, further comprising a user interface to receive user input controlling features of the monitor, the usage information comprising information indicating which features of the monitor are used and quantifying usage for features used.

4. The monitor of claim 1, wherein the usage information comprises an amount of time the monitor has spent in an operating mode.

5. The monitor of claim 1, wherein the monitor comprises a plurality of video ports to connect the monitor to a host device and the usage information comprises an indication of which video port is used.

6. The monitor of claim 1, wherein the integrated circuit is further programmed to provide an On-Screen Display (OSD) on the display device that includes the usage information.

7. The monitor of claim 1, wherein the integrated circuit comprises a display scaler integrated circuit.

8. A host device comprising:
   a processor;
   a memory to provide programming for the processor;
   a video port to connect the host device to an external monitor; and
   a driver to be operated by the processor to control the external monitor through the video port;
   the driver to receive usage information from the external monitor through the video port, the usage information characterizing operation of the external monitor, and transmit the usage information to another device.

9. The host device of claim 8, wherein the driver renders anonymous the usage information to protect anonymity of a user prior to the transmission of the usage information.

10. A method comprising:
    with a monitor, collecting usage information recording usage of the monitor; and
    transmitting the usage information to a host device through a video port of the monitor to which the host device is connected.

11. The method of claim 10, further comprising transmitting the usage information from the host device to a server.

12. The method of claim 11, further comprising rendering the usage information anonymous prior to transmission to the server so as to protect anonymity of a user of the monitor and host device.

13. The method of claim 10, wherein the usage information comprises a listing of what features of the monitor are used.

14. The method of claim 10, wherein the usage information comprises a listing of settings input to the monitor by a user.

15. The method of claim 10, wherein the usage information specifies which ports of the monitor are used.

* * * * *